(12) United States Patent
Kubo

(10) Patent No.: US 6,851,897 B2
(45) Date of Patent: Feb. 8, 2005

(54) CUTTING TOOL INSERT AND CUTTING TOOL

(75) Inventor: Haruaki Kubo, Osaka (JP)

(73) Assignee: Big Daishowa Seiki Co., Ltd., Osaka (JP)

( * ) Notice: Subject to any disclaimer, the term of this patent is extended or adjusted under 35 U.S.C. 154(b) by 148 days.

(21) Appl. No.: 10/279,400

(22) Filed: Oct. 24, 2002

(65) Prior Publication Data

US 2004/0081522 A1 Apr. 29, 2004

(51) Int. Cl.$^7$ ............................................. B23C 5/20
(52) U.S. Cl. ........................................ 407/114; 407/61
(58) Field of Search ............................ 407/40, 41, 48, 407/61, 113, 114

(56) References Cited

U.S. PATENT DOCUMENTS

| | | | | |
|---|---|---|---|---|
| 5,382,118 A | * | 1/1995 | Satran et al. | 407/42 |
| 5,800,100 A | * | 9/1998 | Krenzer | 408/224 |
| 5,951,212 A | * | 9/1999 | Emoto et al. | 407/34 |
| 5,957,755 A | * | 9/1999 | LaFlamme | 451/48 |
| 6,050,752 A | * | 4/2000 | DeRoche | 407/114 |
| 6,196,770 B1 | * | 3/2001 | Astrom et al. | 407/40 |
| 6,293,737 B1 | * | 9/2001 | Satran et al. | 407/113 |
| 2003/0170079 A1 | * | 9/2003 | Daiguji et al. | 407/34 |
| 2004/0022590 A1 | * | 2/2004 | Satran et al. | 407/40 |

FOREIGN PATENT DOCUMENTS

| | | | | |
|---|---|---|---|---|
| EP | 104517 A2 | * | 4/1984 | ............ B23C/5/20 |
| JP | 401228705 A | * | 3/1988 | ........... B23B/27/01 |
| JP | 363099115 A | * | 4/1988 | ............ B23C/5/00 |
| JP | 07 246 505 | | 9/1995 | |
| JP | 09 216 113 | | 8/1997 | |
| JP | 11 513 315 | | 11/1999 | |
| WO | WO 97/10915 | | 3/1997 | |

* cited by examiner

Primary Examiner—A. L. Wellington
Assistant Examiner—Dana Ross
(74) Attorney, Agent, or Firm—Wolf, Greenfield & Sacks, P.C.

(57) ABSTRACT

The cutting tool insert 1 is in a substantially plate form and of polygonal shape and is provided with a major cutting edge 16A (or 16B) extending from one corner 14A (or 14B) toward the other corner 15A (or 15B). The major cutting edge 16A (or 16B) comprises a first edge line and a second edge line that meet to form an obtuse angle, which causes the area where the first and second edge lines meet to protrude slightly outwards, as viewed from above. The first edge line slopes down towards the second edge line so that the distance with a seat face 11 decreases gradually as viewed from the side, and the first edge line forms an obtuse angle with the second edge line causing the top face area to dip down towards the seat face. The first edge line is shorter than the second edge line.

20 Claims, 12 Drawing Sheets

CUTTING TOOL INSERT AND CUTTING TOOL

BACKGROUND OF THE INVENTION

1. Field of the Invention

The present invention relates to an insert mounted on a cutting tool body and also relates to a cutting tool on which this insert is mounted.

2. Description of the Related Art

With a conventional cutting tool that uses an insert mounted on its tool body, a polygonal insert has been employed to make effective use of its corners so that as many positions in one insert as possible can be used. When an insert is mounted on a tool body, the insert is positioned so that it forms a positive axial rake angle, that is, a positive angle relative to the rotation axis of the tool body. Typically, when the axial rake angle becomes large, smooth cutting into a work piece can be realized at the time of cutting operations and the insert is able to execute cutting in more than one position, thereby enabling stable processing with little cutting vibrations. However, with the cutting tool on which the polygonal insert is mounted, it has been difficult to realize a large axial rake angle.

Examples of the polygonal insert are disclosed in, for example, Japanese Patent Laid-Open (Kokai) Publication No. HEI 7-246505, Japanese Patent Laid-Open (Kokai) Publication No. HEI 9-216113, and Japanese Patent (Kohyo) Publication No. HEI 11-513315.

An insert (throw-away insert) described in the Japanese Patent Laid-Open (Kokai) Publication No. HEI 7-246505 has a structure in which a minor cutting edge is provided at a position closer to one corner along an edge line between two corners, and a major cutting edge is provided that extends towards the other corner so that the major cutting edge forms an obtuse angle with the minor cutting edge. The major cutting edge slopes down from the other corner towards the minor cutting edge so as to make the distance to its seat face decrease gradually, and a minor cutting edge flank, which forms a positive relief angle, is provided on the side face extending from the minor cutting edge. Moreover, a first major cutting edge flank that extends from the major cutting edge is provided at the upper position of the side face extending from the major cutting edge, and this first major cutting edge flank is set to have a smaller relief angle than that of the minor cutting edge flank. Accordingly, it exerts no influence over the ability to cut at a right angle. Particularly, it is possible to improve the cutting blade strength of the major cutting edge portion and to extend the life of the insert chip.

An insert (throw-away insert) described in the Japanese Patent Laid-Open (Kokai) Publication No. HEI 9-216113 is structured in such a manner that: a relief angle of the insert in a substantially square shape is positive; as viewed from above, a cutting edge on its top face protrudes gradually from the corners on both ends towards the middle part; and, as viewed from the side of the throw-away insert, the cutting edge gradually slopes down towards the middle part from the corners on both ends. The same insert can be used even if the cutting tool is for left-handed use. Moreover, it is possible to finish off the cutting, even without any minor cutting edge, in such a manner that the bottom part of a work piece by making a right angle cut can form an approximate 90-degree angle with the side face of the work piece.

An insert described in the Japanese Patent (Kohyo) Publication No. HEI 11-513315 comprises a body part in a substantially rectangular column which has a top face, a bottom face, and at least two pairs of adjacent side faces. When viewed from above, a pair of corners along its diagonal line constitutes a cutting edge and the side faces extending respectively from the other pair of corners towards the corners constituting the cutting edges are receptacle surfaces to be received by a cutting tool.

Concerning the inserts described in the Japanese Patent Laid-Open (Kokai) Publication No. HEI 7-246505 and the Japanese Patent Laid-Open (Kokai) Publication No. HEI 9-216113, it is possible to set the axial rake angle to a larger value than the inclination angle of the major cutting edge. However, if the axial rake angle is set to this large value so as to realize smooth cutting into a work piece at the time of cutting operations, to allow sufficient improvement in cutting performance, and to realize sufficiently stable processing with almost no cutting vibrations, it becomes difficult to cause the envelope of the insert formed during the rotations of the cutting tool to constitute a cylindrical surface. Accordingly, it is still difficult to form a sufficiently large axial rake angle.

Concerning the insert described in the Japanese Patent (Kohyo) Publication No. HEI 11-513315, since, as viewed from above, a pair of corners along its diagonal line constitutes the cutting edges and the side faces extending respectively from the other pair of corners towards the corners constituting the cutting edges are the receptacle surfaces (referring to the fact that they are not cutting edges), the maximum cutting depth is shallow.

SUMMARY OF THE INVENTION

The present invention aims to solve the above-mentioned conventional problems. It is the object of this invention to provide a cutting tool insert capable of forming a cylindrical envelope, realizing a sufficiently large axial rake angle, exhibiting improved cutting performance, and conducting stable processing with little cutting vibrations, and to also provide a cutting tool on which this insert is mounted.

In order to achieve this object, this invention provides a cutting tool insert in a substantially plate form and of polygonal shape, wherein the edge lines on its top face opposite its seat face are formed as cutting edges, the top surface functions as a tooth face, and the side faces extending from the tooth face towards the seat face are flanks. A major cutting edge is provided that extends from one corner to the other corner as viewed from above. As viewed from above, the major cutting edge comprises a first edge line and a second edge line that meet to form an obtuse angle, which causes the area where the first and second edge line meet to protrude slightly outwards. As viewed from the side, the first edge line slopes down towards the second edge line so as to make the distance to these at face decrease gradually, and forms an obtuse angle with the second edge line causing the top face area to dip down towards the seat face, and, further, the first edge line is shorter than the second edge line.

Concerning the insert having the above-described structure, since the first edge line slopes down towards the second edge line so as to make the distance to the seat face decrease gradually and the first edge line is shorter than the second edge line, even if the insert is mounted on the cutting tool body at a sufficiently large axial rake angle, it is possible to cause the envelope of the insert, which is formed by rotations of the cutting tool, to constitute a cylindrical surface. Accordingly, it is possible to enable smooth cutting into a work piece at the time of cutting operations, to sufficiently improve cutting performance, and to conduct sufficiently stable processing with almost no cutting vibrations. Moreover, even if the second cutting edge makes contact with the work piece during the cutting operation, the second edge line is available to cut the work piece. Furthermore, it is possible to reduce changes in the relief angle of the first edge line. It is desirable that the first edge line has an arc shape and constitutes a cylindrical envelope.

The inclination angle of the first edge line with the seat face can be set to 10° or more as viewed from the side. Accordingly, in addition to the above-described advantages, this setting makes it possible to make the angle of the flank smaller and to further improve the cutting blade strength.

When the insert is mounted on the cutting tool body, the axial rake angle of the major cutting edge is approximately 5° to 15° for a common insert. The axial rake angle of approximately 30°, as in the case of a solid end mill, is not realized regarding any common insert. In order to form an optimal axial rake angle, the insert is inclined to some degree relative to the axial direction and is mounted on the cutting tool body. At this time, if the insert is inclined too much (for example, at 20° or more) relative to the cutting tool body, the strength of the cutting tool body tends to lower. If the inclination angle of the first edge line with the seat face is set to 10° or more as viewed from the side, and even if the insert is inclined and mounted at 20° or less relative to the cutting tool body, it is possible to obtain the desirable axial rake angle of approximately 30° as mentioned above. In other words, if the inclination angle of the first edge line with the seat face is less than 10° as viewed from the side, the strength of the cutting tool body tends to lower.

The tooth face can include a first edge line tooth face sloping down from the first edge line towards the center of the insert so as to make the distance to the seat face decrease gradually.

The tooth face can include a second edge line tooth face sloping down from the second edge line to wards the center of the insert so as to make the distance to the seat face decrease gradually.

A second flank can be provided that extends along the second edge line towards the seat face, and the second flank can form a right angle or an obtuse angle with the seat face.

The second flank can be a receptacle face to be attached to a cutting tool body. Since the second edge line is longer than the first edge line, the second flank is also made long. Accordingly, when the second flank is used as the receptacle face, it is possible to attach the insert to the cutting tool body more stably.

Moreover, a first flank can be provided that extends along the first edge line towards the seat face, and the first flank can form a right angle or an obtuse angle with the seat face. This structure allows the first flank not to be in contact with the cutting tool body when the insert is mounted on the cutting tool body, so it is possible to prevent the first flank from being damaged.

Furthermore, concerning the insert of this invention, as viewed from above, a minor cutting edge can be provided so as to form a corner with the first edge line of the major cutting edge and extend toward the opposite side of the first edge line of the major cutting edge, and the minor cutting edge can form a right angle or an acute angle with the major cutting edge.

A minor cutting edge flank can be formed on a side face extending from the minor cutting edge, and the minor cutting edge flank can form a positive relief angle with the minor cutting edge.

Moreover, the tooth face can include a minor tooth face sloping down from the minor cutting edge towards the center of the insert so as to make the distance to the seat face decrease gradually.

Furthermore, it is possible to employ a structure in which, as viewed from above, the minor cutting edge may form an obtuse angle with an edge line extending towards a corner which is positioned on the minor cutting edge side and which is adjacent to the corner formed with the major cutting edge and the minor cutting edge. When the cutting is performed by using the minor cutting edge, the above-described structure makes it possible to prevent the edge line, which extends towards a corner which is positioned on the minor cutting edge side and which is adjacent to the corner formed with the major cutting edge and the minor cutting edge, from becoming in contact with the work, and to make such edge line function as the receptacle face to be attached to the cutting tool. Therefore, it is possible to prevent the minor cutting edge from being damaged.

This invention also provides a cutting tool that comprises the cutting tool insert described above and a tool body on which the cutting tool insert is mounted. Concerning the cutting tool having this structure, even if the insert is set at a sufficiently large axial rake angle, it is possible to cause the envelope of the insert, which is formed during the rotations of the cutting tool, to constitute a cylindrical surface. Accordingly, it is possible to realize smooth cutting into a work piece at the time of cutting operations, to sufficiently improve cutting performance, and to conduct sufficiently stable processing with almost no cutting vibrations. Moreover, even if the second edge line makes contact with the work piece during the cutting operations, the second edge line is available to cut the work piece.

The insert can be mounted on the tool body in a manner such that at least the axial rake angle of the first cutting edge line of the major cutting edge may become a positive angle and a radial rake angle may become a positive angle because of a rake angle of the main cutting edge of this invention.

Moreover, the major cutting edge positioned on the outer surface of the tool body can be structure in a manner such that a turning radius of the front end of the first edge line relative to the rotation axis of the tool body may be almost the same as a turning radius of the rear end of the first edge line relative to the rotation axis of the tool body.

Furthermore, the major cutting edge positioned on the outer surface of the tool body can be structured in a manner such that a turning radius of the second edge line relative to the rotation axis of the tool body may be almost the same as or less than the turning radius of the front end of the first edge line.

DETAILED DESCRIPTION OF THE PREFERRED EMBODIMENTS

Explanations are hereinafter given about the cutting tool insert and the cutting tool on which this insert is mounted, according to preferred embodiments of this invention with reference to the attached drawings.

Embodiment 1

Figure 1:
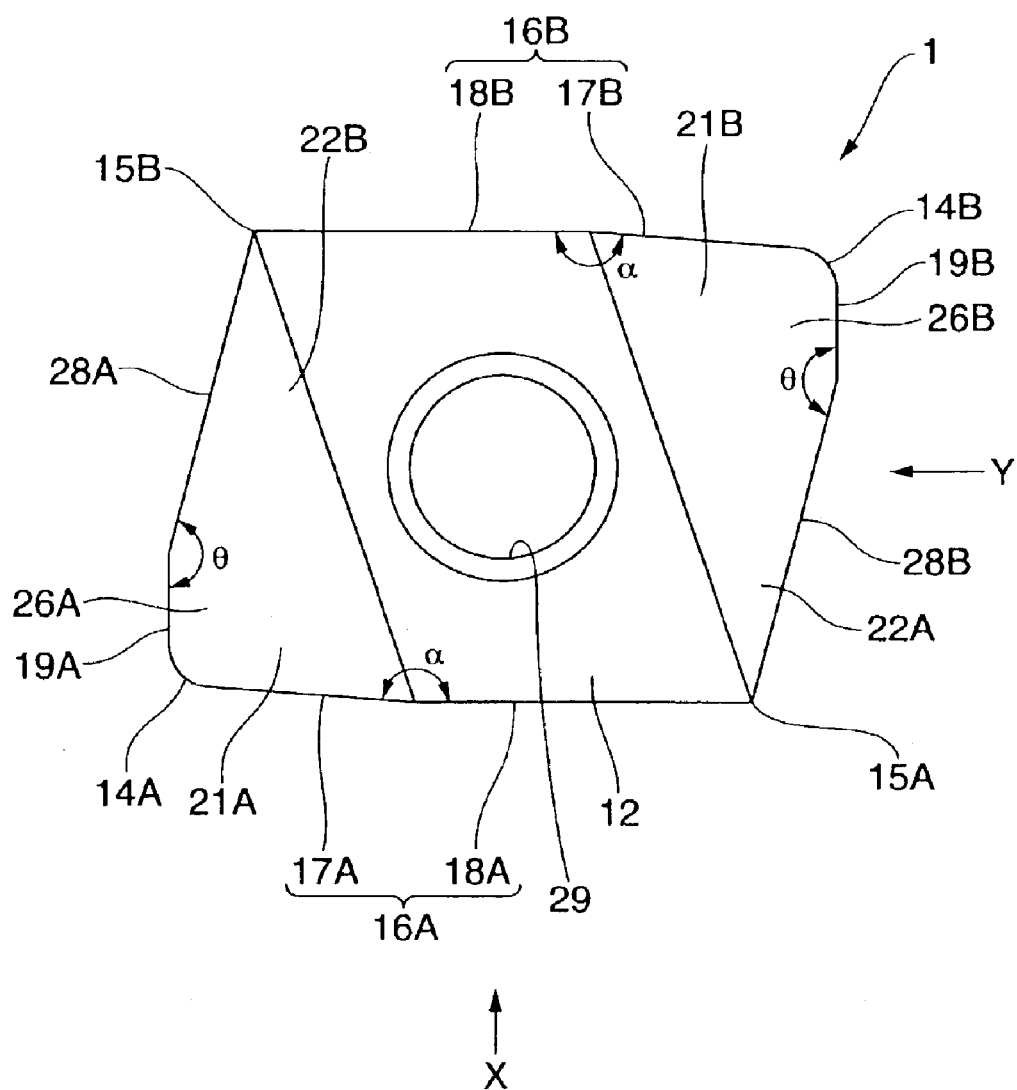
FIG. 1 is a top view of a cutting tool insert according to Embodiment 1 of this invention.
Figure 2:
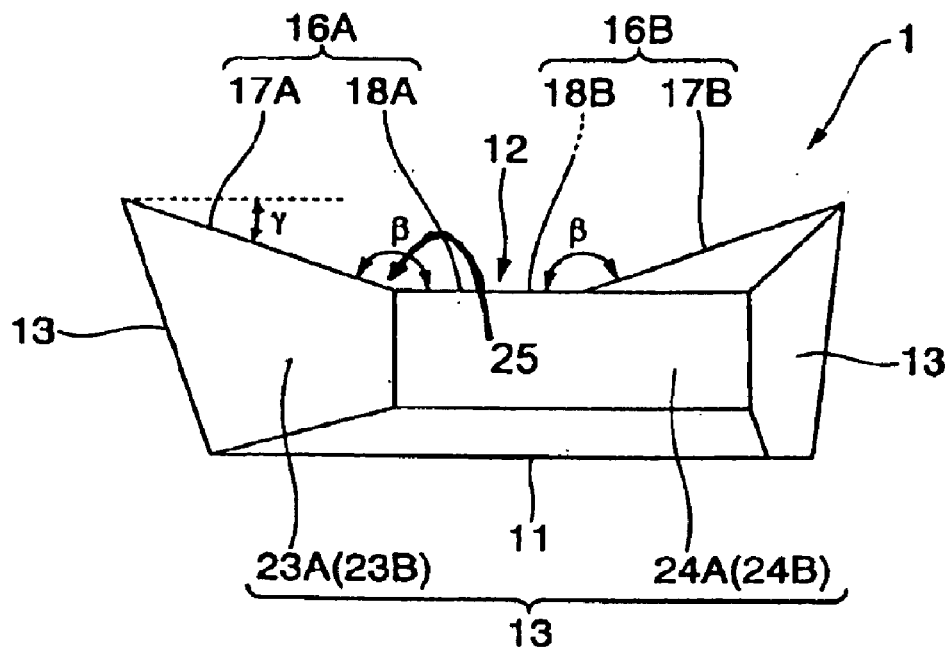
FIG. 2 is a side view of the insert of FIG. 1 as seen from the direction indicated by arrow X.
Figure 3:
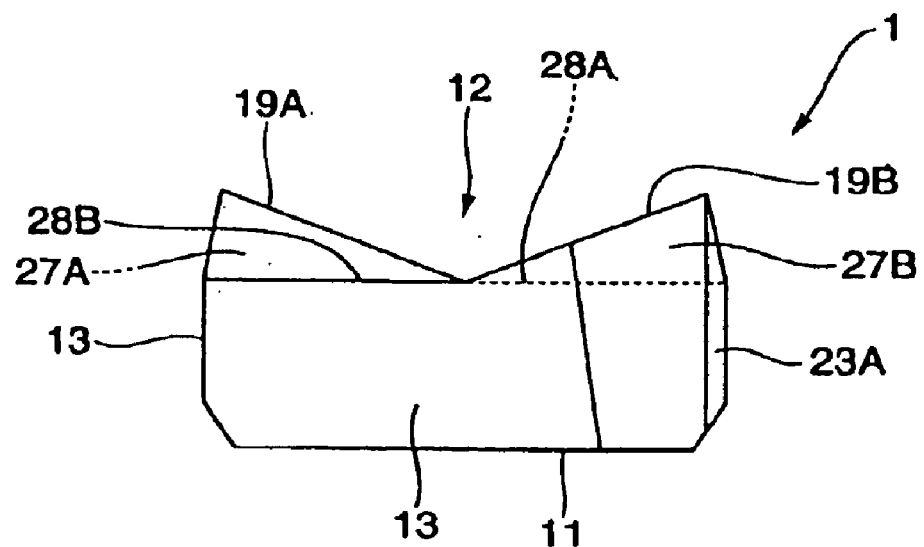
FIG. 3 is a side view of the insert of FIG. 1 as seen from the direction indicated by arrow Y.
Figure 4:
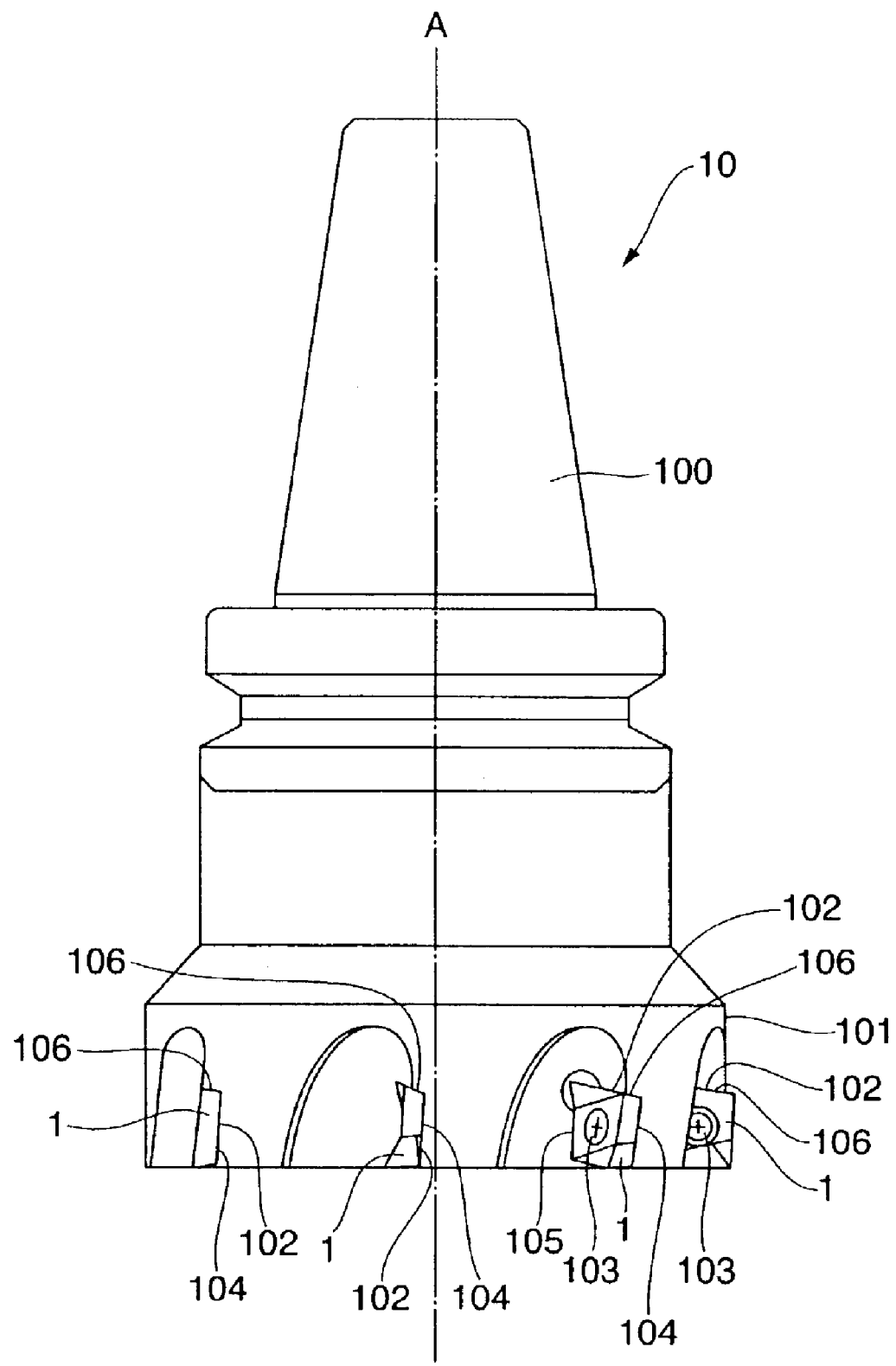
FIG. 4 is a side view of a cutting tool on which the cutting tool inserts are mounted according to Embodiment 1 of this invention.
Figure 5:
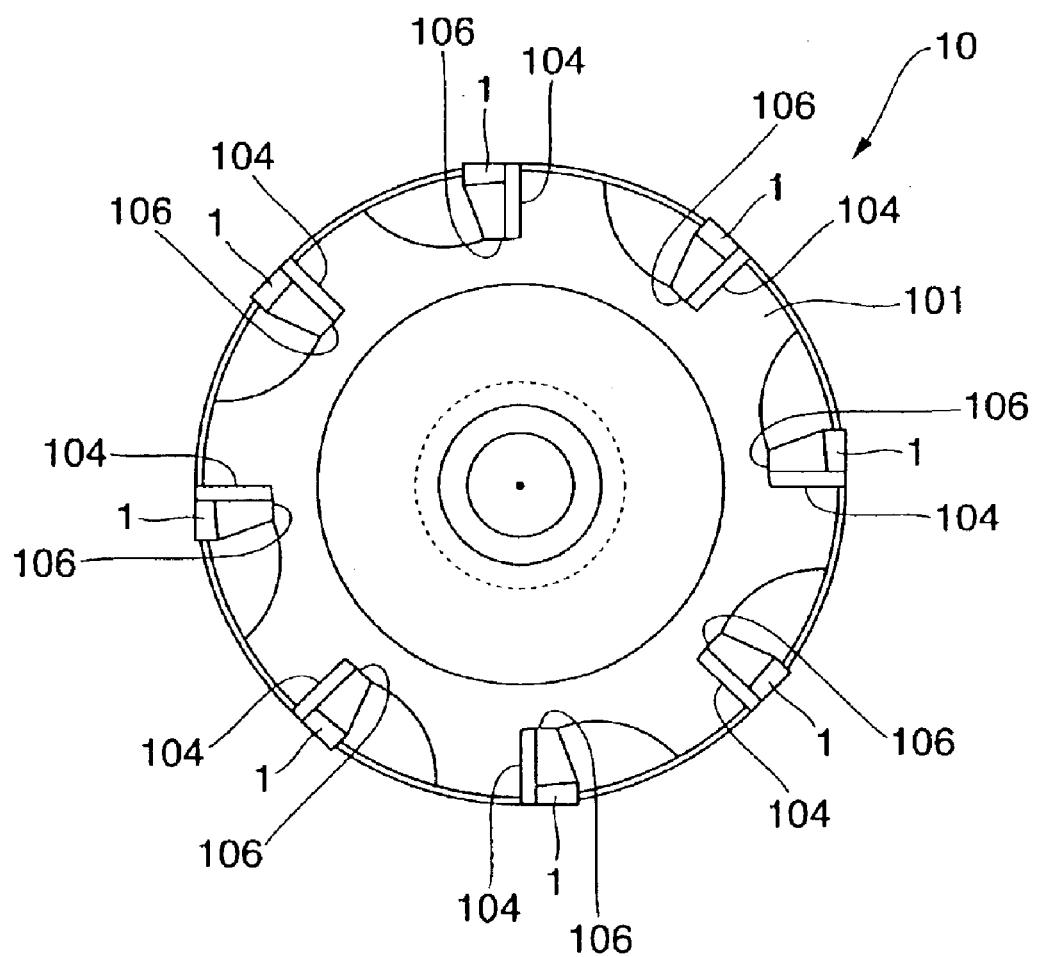
FIG. 5 is a bottom view of the cutting tool shown in FIG. 4.
Figure 6:
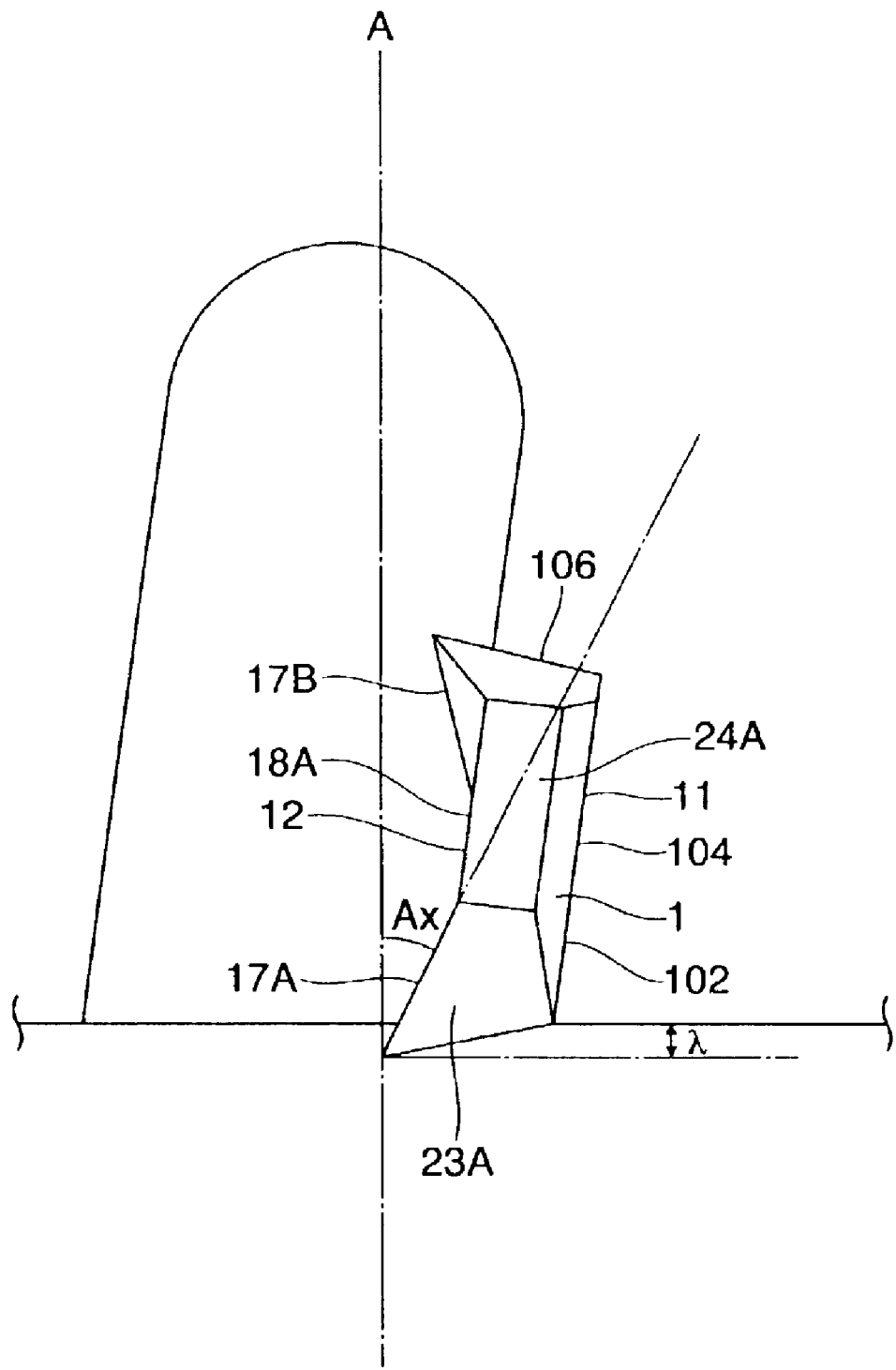
FIG. 6 is an enlarged view of a part of the cutting tool shown in FIG. 4.
Figure 7:
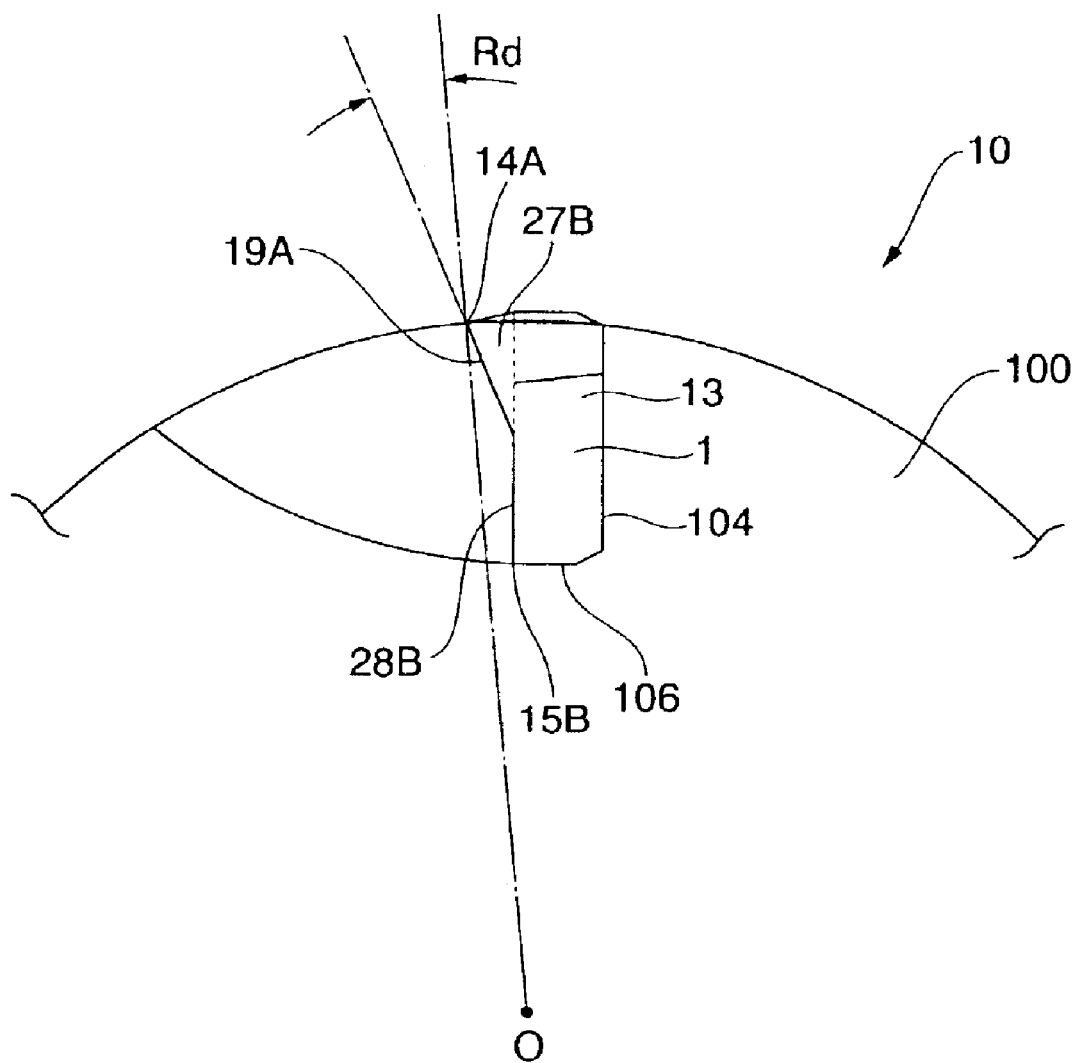
FIG. 7 is an enlarged view of a part of the cutting tool shown in FIG. 5.

FIG. 1 is a top view of a cutting tool insert according to Embodiment 1 of this invention. FIG. 2 is a side view of the insert of FIG. 1 as seen from the direction indicated by arrow X. FIG. 3 is a side view of the insert of FIG. 1 as seen from the direction indicated by arrow Y. FIG. 4 is a side view of a cutting tool on which the cutting tool inserts are mounted according to Embodiment 1 of this invention. FIG. 5 is a bottom view of the cutting tool shown in FIG. 4. FIG. 6 is an enlarged view of a part of the cutting tool shown in FIG. 4. FIG. 7 is an enlarged view of a part of the cutting tool shown in FIG. 5.

As shown in FIGS. 1 to 7, a cutting tool insert 1 according to Embodiment 1 is in a substantially plate form and of substantially parallelogrammic (polygonal) shape as viewed from above. The insert 1 includes a seat face (or bottom face) 11, a top face 12 opposite the seat face 11, and side faces 13 extending from the seat face 11 towards the top face 12. The edge lines on the top face 12 are formed as cutting edges, the top surface 12 functions as a tooth face, and the side faces 13 are flanks.

On this insert 1, a major cutting edge 16A is formed that extends from one corner 14A to the other corner 15A adjacent to the corner 14A as viewed from above (see FIG. 1). Likewise, a major cutting edge 16B is formed that extends from one corner 14B to the other corner 15B. Also, a minor cutting edge 19A is formed on one side of the corner 14A positioned opposite the major cutting edge 16A side, and a minor cutting edge 19B is formed on one side of the corner 14B positioned opposite the major cutting edge 16B side.

The major cutting edge 16A (or 16B) includes a first major cutting edge 17A (or 17B), which is a first edge line, and a second major cutting edge 18A (or 18B), which is a second edge line that meets with the first edge line to form an obtuse angle a, the area around which protrudes slightly outwards, as viewed from above. As viewed from the side (see FIG. 2), this first major cutting edge (or first edge line) 17A (or 17B) slopes down towards the second major cutting edge (or second edge line) 18A (or 18B) so as to make the distance to the seat face 11 decrease gradually. The first major cutting edge 17A (or 17B) forms an obtuse angle β with the second major cutting edge 18A (or 18B) causing the area 25 of the top face around the obtuse angle β to dip down towards the seat face 11, and the first major cutting edge 17A (or 17B) is made shorter than the second major cutting edge 18A (or 18B). Moreover, an inclination angle γ of the first major cutting edge 17A (or 17B) with the seat face 11 is set to 10° or more (about 20° in Embodiment 1) as viewed from the side.

The minor cutting edge 19A (or 19B) is provided in a manner such that it forms an approximately 90-degree angle with the first major cutting edge 17A (or 17B). As viewed from above, the minor cutting edge 19A forms an obtuse angle θ with an edge line 28A extending from the minor cutting edge 19A towards the corner 15B, and the minor cutting edge 19B forms the obtuse angle θ with an edge line 28B extending from the minor cutting edge 19B towards the corner 15A. According to Embodiment 1, when the insert 1 is mounted on a cutting tool body 100, the side face 13 extending from the edge line 28A (or 28B) towards the seat face 11 becomes a receptacle face to be attached to the cutting tool body 100.

The tooth face formed by the top face 12 of the insert 1 includes: a first tooth face 21A (or 21B) sloping down from the first major cutting edge 17A (or 17B) towards the center of the insert 1 so as to make the distance to the seat face 11 decrease gradually as viewed from the side; a second tooth face 22A (or 22B) sloping down from the second major cutting edge 18A (or 18B) towards the center of the insert 1 so as to make the distance to the seat face 11 decrease gradually as viewed from the side; and a minor cutting edge tooth face 26A (or 26B) sloping down from the minor cutting edge 19A (or 19B) towards the center of the insert 1 so as to make the distance to the seat face 11 decrease gradually.

The flanks formed by the side faces 13 of the insert 1 includes: a first flank 23A (or 23B) extending from the first major cutting edge 17A (or 17B) towards the seat face 11; a second flank 24A (or 24B) extending from the second major cutting edge 18A (or 18B) towards the seat face 11; and a minor cutting edge flank 27A (or 27B) extending from the minor cutting edge 19A (or 19B) towards the seat face 11. The first flank 23A (or 23B) forms an approximately 90-degree angle with the seat face 11. Moreover, the second flank 24A (or 24B) forms an approximately 90-degree angle with the seat face 11 and functions as the receptacle face to be attached to the cutting tool body 100. The minor cutting edge flank 27A (or 27B) is provided so as to form a positive relief angle λ (see FIG. 6) with the minor cutting edge 19A (or 19B).

In the substantially center part of the top face 12 of the insert 1, a screw hole 29 which extends from the top face 12 to the seat face 11 is made in order to fasten the insert 1 to the cutting tool body 100 with a screw.

The cutting tool body 100, on which the above-described insert 1 is mounted, has a reference rotation axis A (see FIG. 4) and includes a cutting head 101 on which a plurality of inserts 1 (eight pieces in Embodiment 1) are mounted. In the cutting head 101, pockets 102 for receiving the respective inserts 1 are formed at evenly spaced positions. Each pocket 102 has: a support face 104 for supporting the seat face 11 of the insert 1 to be retained within the pocket 102 by a screw 103; a support face 105 for supporting the second flank 24A (or 24B); and a support face 106 for supporting the side face 13 extending from the edge line 28A (or 28B) towards the seat face 11.

A cutting tool 10 with the inserts 1 of Embodiment 1 mounted on its cutting tool body 100 is structured in the following manner: concerning the major cutting edge 16A (or 16B) positioned on the outer surface of the cutting tool body 100, a turning radius of the front end of the first major cutting edge 17A (or 17B) relative to the rotation axis A of the cutting tool body 100 (see FIG. 4), is almost the same as a turning radius of the rear end of the first major cutting edge 17A (or 17B) relative to the rotation axis A. Moreover, a turning radius of the second major cutting edge 18A (or 18B) relative to the rotation axis A is almost the same as or less than the turning radius of the front end of the first major cutting edge 17A (or 17B)

Furthermore, since the insert 1 is formed in the shape described above, even if the insert 1 is set at a sufficiently large axial rake angle Ax (see FIG. 6), it is possible to cause the envelope of the insert 1 formed during the rotations of the cutting tool 10 to constitute a cylindrical surface. It is also possible to form a radial rake angle Rd (the angle formed between the envelope and the major cutting edge tooth face) of the first major cutting edge 17A (or 17B) as a positive angle. Accordingly, it is possible to realize smooth cutting into a work piece at the time of cutting operations, to sufficiently improve the cutting performance, and to conduct sufficiently stable processing with almost no cutting vibrations. It is also possible to reduce changes in the relief angle of the first major cutting edge 17A (or 17B) Moreover, even if the second major cutting edge 18A (or 18B) makes contact with a work piece during the cutting operations, the second major cutting edge 18A (or 18B) is available to cut the work piece.

The second flank 24A and 24B can be provided with a large area. Since these portions become the receptacle faces to be attached to the cutting tool body 100, it is possible to enhance attachment stability of the cutting tool body 100.

Moreover, since the first flank 23A (or 23B) does not become the receptacle face to be attached to the cutting tool body 100, it is possible to prevent the first flank 23A and 23B from being damaged, thereby enabling excellent cutting.

According to Embodiment 1, the inclination angle γ of the first major cutting edge 17A (or 17B) with the seat face 11 is set to approximately 20° as viewed from the side. The invention is not limited to this setting, however it is desirable that the inclination angle γ be 10° or more.

According to Embodiment 1, the minor cutting edge 19A (or 19B) is set so as to form a substantially right angle with the first major cutting edge 17A (or 17B). The invention is not limited to this setting, however the minor cutting edge 19A (or 19B) may be set to form an acute angle with the first major cutting edge 17A (or 17B).

According to Embodiment 1, the first flank 23A (or 23B) is set so as to form an approximately 90-degree angle with the seat face 11. The invention is not limited to this setting, however the first flank 23A (or 23B) may be set to form an obtuse angle with the seat face 11.

Moreover, according to Embodiment 1, the second flank 24A (or 24B) is set so as to form a substantially right angle with the seat face 11. The invention is not limited to this setting, however the second flank 24A (or 24B) may be set to form an obtuse angle with the seat face 11.

Figure 12:
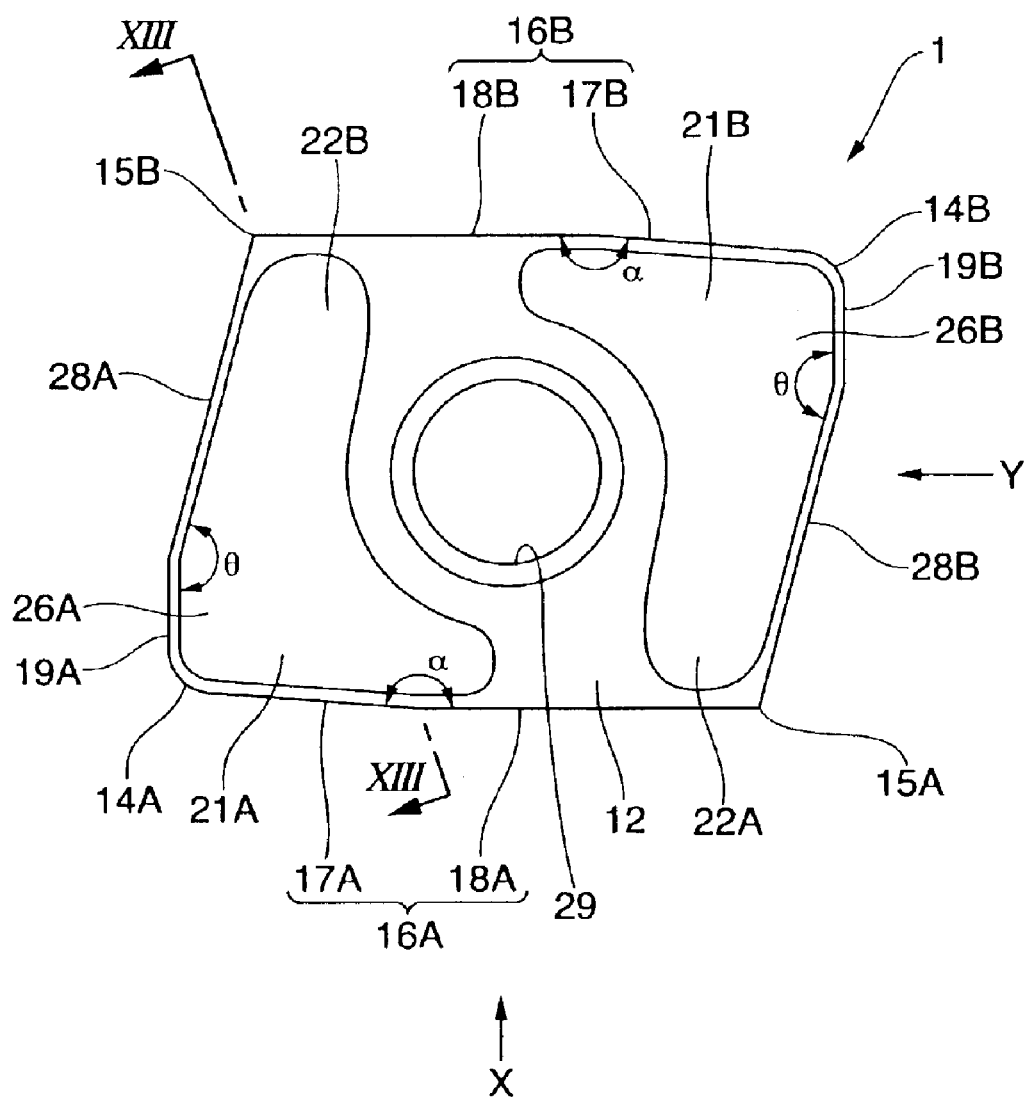
FIG. 12 is a top view of a cutting tool insert according to another embodiment of this invention.
Figure 13:
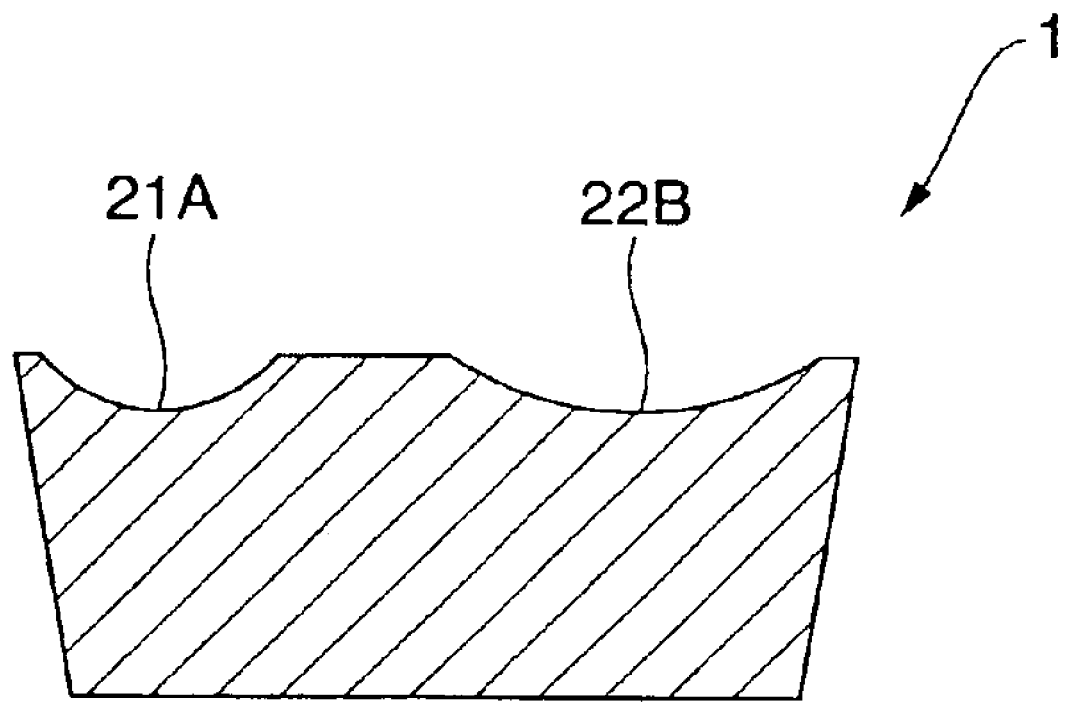
FIG. 13 is a sectional view of the cutting tool insert taken on line XIII—XIII of FIG. 12.

Furthermore, according to Embodiment 1, as viewed from the side as in FIGS. 2 and 3, the tooth face is composed of flat planes. The invention is not limited to this structure, however, the tooth face may be composed of a curved surface as shown in FIGS. 12 and 13.

Embodiment 2

Explanations are hereinafter given about the cutting tool insert and the cutting tool on which this insert is mounted according to Embodiment 2 of this invention, with reference to the attached drawings.

Figure 8:
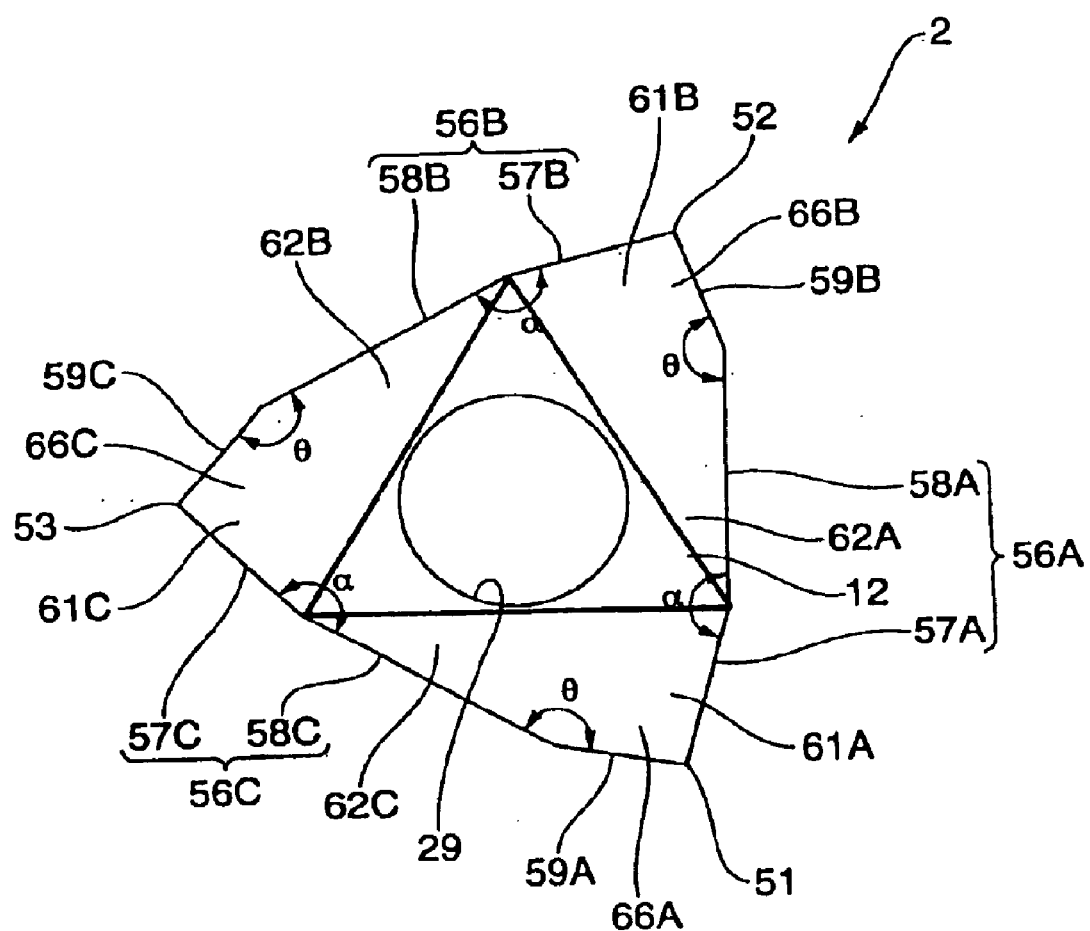
FIG. 8 is a top view of a cutting tool insert according to Embodiment 2 of this invention.
Figure 9:
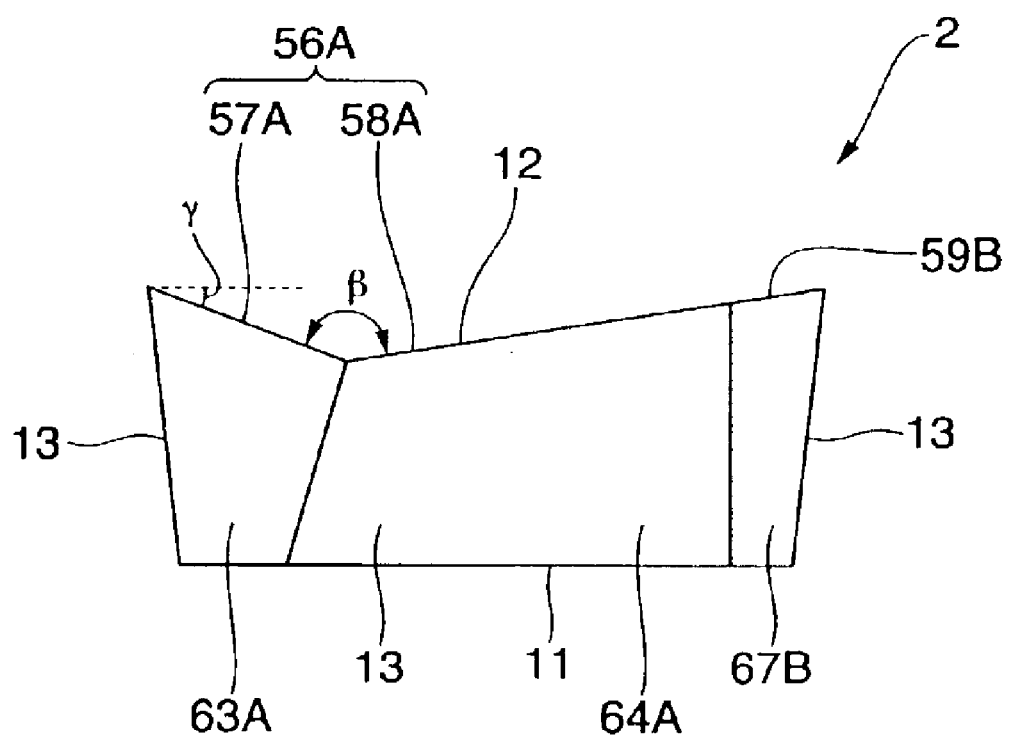
FIG. 9 is a side view of the insert shown in FIG. 8.
Figure 10:
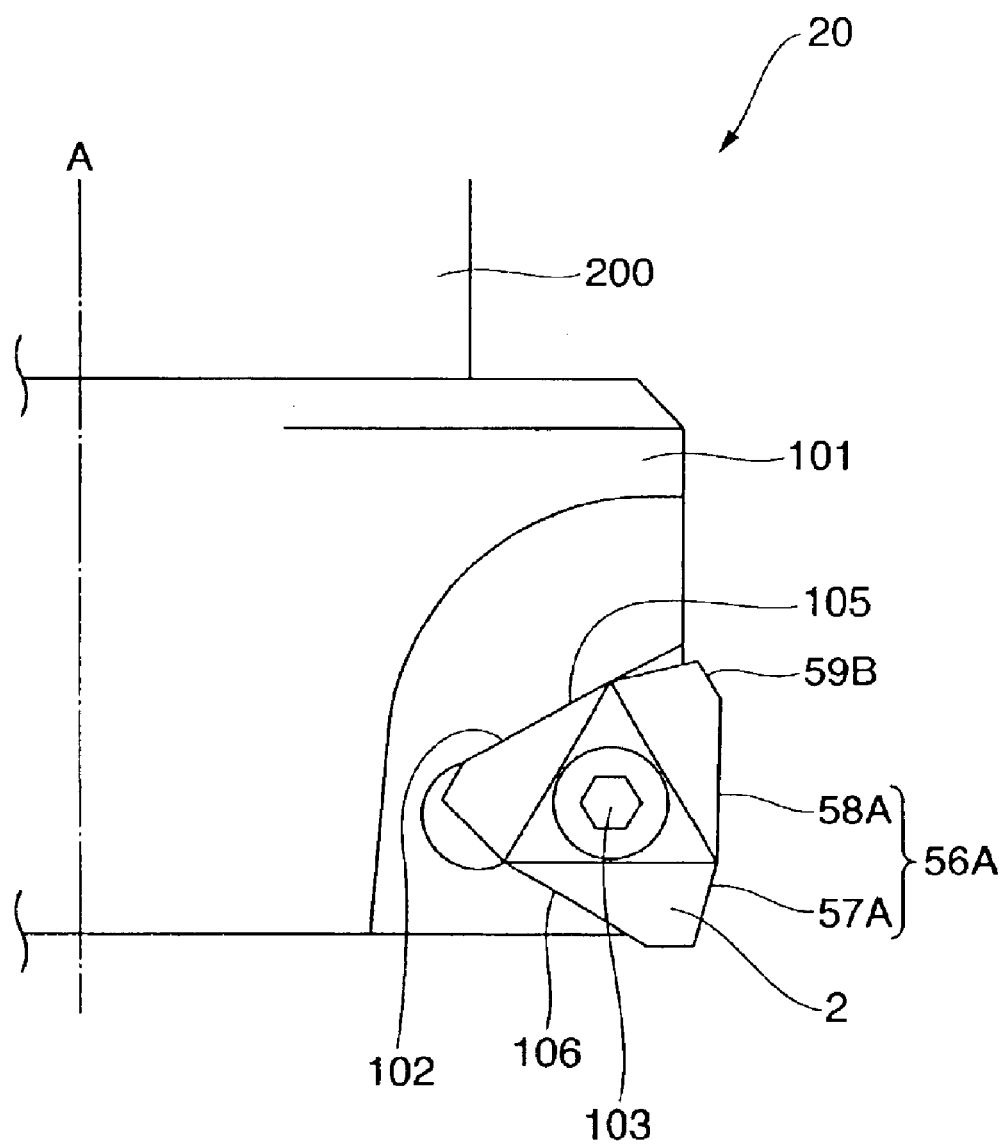
FIG. 10 is a side view of a part of the cutting tool on which the cutting tool insert is mounted according to Embodiment 2 of this invention.
Figure 11:
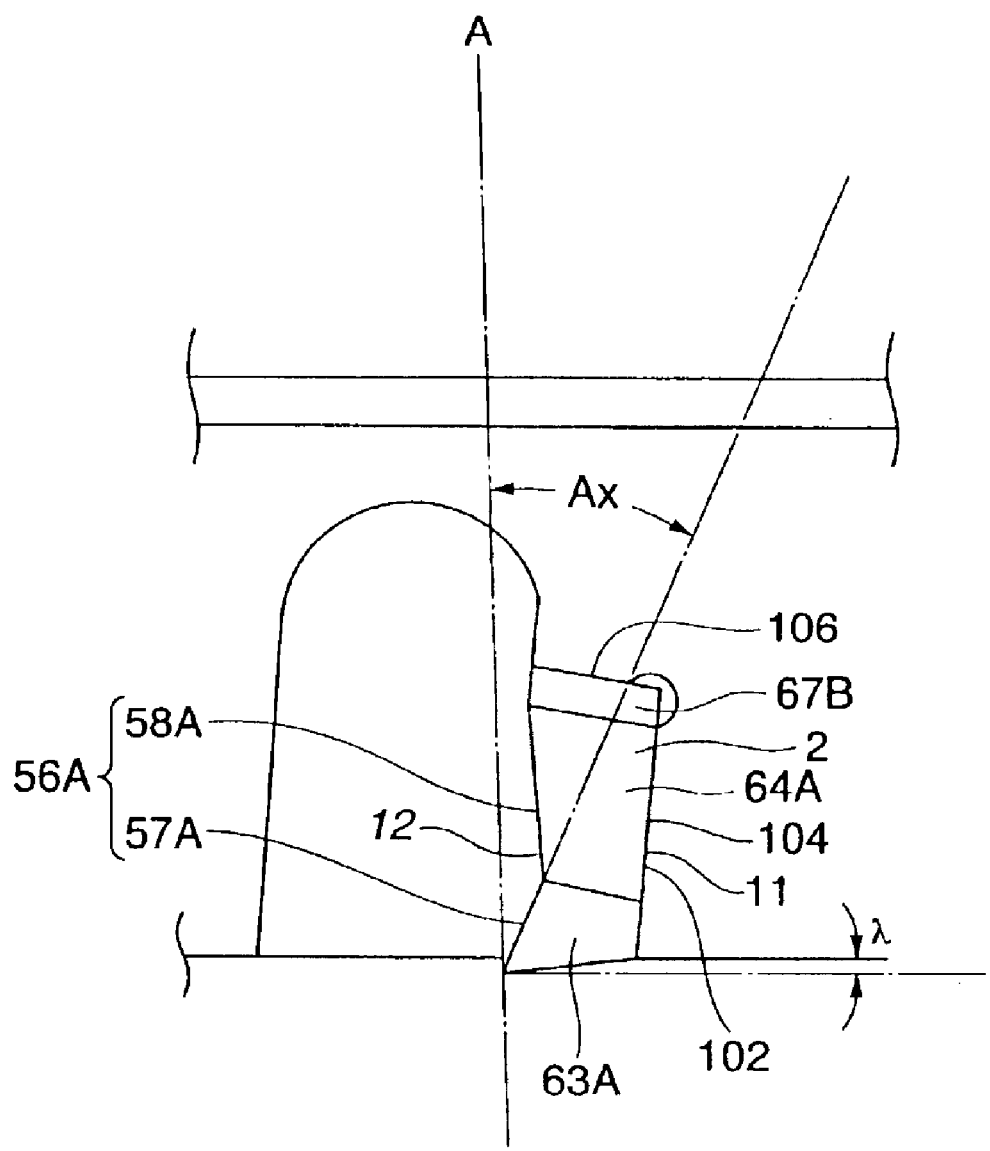
FIG. 11 is a side view of a part of the cutting tool on which the cutting tool insert is mounted according to Embodiment 2 of this invention.

FIG. 8 is a top view of a cutting tool insert according to Embodiment 2 of this invention. FIG. 9 is a side view of the insert shown in FIG. 8. FIGS. 10 and 11 are side views of a part of the cutting tool on which the cutting tool insert is mounted according to Embodiment 2 of this invention.

Concerning Embodiment 2, members similar to those described in Embodiment 1 are given the same reference numerals as in Embodiment 1, and any detailed description thereof is omitted.

The main difference between an insert 2 of Embodiment 2 and the insert 1 of Embodiment 1 is that the insert 2 is in a substantially triangular shape as viewed from above. Specifically, as shown in FIGS. 8 through 11, the insert 2 is a substantially plate form of substantially triangular (polygonal) shape as viewed from above. Three corners of the insert 2 can be used for cutting operations. The insert 2 includes a seat face (or bottom face) 11, a top face 12 opposite the seat face 11, and side faces 13 extending from the seat face 11 towards the top face 12. The edge lines on the top face 12 are formed as cutting edges, the top surface 12 functions as a tooth face, and the side faces 13 are flanks.

On this insert 2, a major cutting edge 56A is formed that extends from one corner 51 to the other corner 52 adjacent to the corner 51 as viewed from above (see FIG. 8). Likewise, a major cutting edge 56B is formed that extends from one corner 52 to the other corner 53, and a major cutting edge 56C is formed that extends from the corner 53 to the corner 51. Also, a minor cutting edge 59A is formed on one side of the corner 51 positioned opposite the major cutting edge 56A side, and a minor cutting edge 59B is formed on one side of the corner 52 positioned opposite the major cutting edge 56B side, and a minor cutting edge 59C is formed on one side of the corner 53 positioned opposite the major cutting edge 56C side.

The major cutting edge 56A (or 56B or 56C) includes a first major cutting edge 57A (or 57B or 58C), which is a first edge line, and a second major cutting edge 58A (or 58B or 58C) which is a second edge line that meets with a first edge line to form an obtuse angle α, the area around which protrudes slightly outwards as viewed from above. As viewed from the side (see FIG. 9), this first major cutting edge (or first edge line) 57A (or 57B or 57C) slopes down towards the second major cutting edge (or second edge line) 58A (or 58B or 58C) so as to make the distance to the seat face 11 decrease gradually. The first major cutting edge 57A (or 57B or 57C) forms an obtuse angle β with the second major cutting edge 58A (or 58B or 58C) causing the top face area to dip down towards the seat face 11, and the first major cutting edge 57A (or 57B or 57C) is made shorter than the second major cutting edge 58A (or 58B or 58C). Moreover, an inclination angle γ of the first major cutting edge 57A (or 57B or 57C) with the seat face 11 is set to 10° or more (about 20° in Embodiment 2) as viewed from the side.

The minor cutting edge 59A (or 59B or 59C) is provided in a manner such that it forms an acute angle with the first major cutting edge 57A (or 57B or 57C) as viewed from above. As viewed from above, the minor cutting edge 59A forms an obtuse angle θ with the second major cutting edge 58C, and the minor cutting edge 59B forms the obtuse angle θ with the second major cutting edge 58A, and the minor cutting edge 59C forms the obtuse angle θ with the second major cutting edge 58B.

According to Embodiment 2, when the insert 2 is mounted on a cutting tool body 200, the side face 13 extending towards the seat face 11 from the remaining second major cutting edges (for example, 58B are 58C) that are not involved in the cutting operations, that is, second flanks (for example, 64B and 64C) described later in detail, become receptacle faces to be attached to the cutting tool body 200.

The tooth face formed by the top face 12 of the insert 2 includes: a first tooth face 61A (or 61B or 61C) sloping down from the first major cutting edge 57A (or 57B or 57C) towards the center of the insert 2 so as to make the distance to the seat face 11 decrease gradually as viewed from the side; a second tooth face 62A (or 62B or 62C) sloping down from the second major cutting edge 58A (or 58B or 58C) towards the center of the insert 2 so as to make the distance to the seat face 11 decrease gradually as viewed from the side; and a minor cutting edge tooth face 66A (or 66B or 66C) sloping down from the minor cutting edge 59A (or 59B or 59C) towards the center of the insert 2 so as to make the distance to the seat face 11 decrease gradually.

The flanks formed by the side faces 13 of the insert 2 includes: a first flank 63A (or 63B or 63C) extending from the first major cutting edge 57A (or 57B or 57C) towards the seat face 11; a second flank 64A (or 64B or 64C) extending from the second major cutting edge 58A (or 58B or 58C) towards the seat face 11; and a minor cutting edge flank 67A (or 67B or 67C) extending from the minor cutting edge 59A (or 59B or 59C) towards the seat face 11. The first flank 63A (or 63B or 63C) forms an obtuse angle with the seat face 11. Moreover, the second flank 64A (or 64B or 64C) forms an obtuse angle with the seat face 11. The minor cutting edge flank 67A (or 67B or 67C) is provided so as to form a positive relief angle $\lambda$ (see FIG. 11) with the minor cutting edge 59A (or 59B or 59C).

In the substantially center part of the top face 12 of the insert 2, a screw hole 29 is made in the same manner as in Embodiment 1.

The cutting tool body 200, on which the above-described insert 2 is mounted, has a structure substantially pursuant to that of the cutting tool body 100 as described in Embodiment 1, has a reference rotation axis A (see FIG. 10), and includes a cutting head 101 on which a plurality of inserts 2 are mounted. In the cutting head 101, pockets 102 for receiving the respective inserts 2 are formed. Each pocket 102 has: a support face 104 for supporting the seat face 11 of the insert 2; a support face 105 for supporting the second flank 64B (or 64A or 64C); and a support face 106 for supporting the second flank 64C (or 64A or 64B).

A cutting tool 20 with the inserts 2 of Embodiment 2 mounted on its cutting tool body 200 is structured in the following manner: concerning the major cutting edge 56A (or 56B or 56C) positioned on the outer surface of the cutting tool body 200, a turning radius of the front end of the first major cutting edge 57A (or 57B or 57C) relative to the rotation axis A of the cutting tool body 200 (see FIG. 10), is almost the same as a turning radius of the rear end of the first major cutting edge 57A (or 57B or 57C) relative to the rotation axis A. Moreover, a turning radius of the second major cutting edge 58A (or 58B or 58C) relative to the rotation axis A is almost the same as or less than the turning radius of the front end of the first major cutting edge 57A (or 57B or 57C).

Furthermore, since the insert 2 is formed in the shape described above, even if the insert 2 is set at a sufficiently large axial rake angle Ax (see FIG. 11), it is possible to cause the envelope of the insert 2 formed during the rotations of the cutting tool 20 to constitute a cylindrical surface. As in the case of Embodiment 1, it is also possible to form a radial rake angle Rd of the first major cutting edge 57A (or 57B or 57C) as a positive angle. Accordingly, it is possible to realize smooth cutting into a work piece at the time of cutting operations, to sufficiently improve the cutting performance, and to conduct sufficiently stable processing with almost no cutting vibrations. It is also possible to reduce changes in the relief angle of the first major cutting edge 57A (or 57B or 57C). Moreover, even if the second major cutting edge 58A (or 58B or 58C) makes contact with the work piece during the cutting operations, the second major cutting edge 58A (or 58B or 58C) is available to cut the work piece.

The second flank 64A, 64B and 64C can be provided with a large area. Since these portions become the receptacle faces to be attached to the cutting tool body 200, it is possible to enhance attachment stability to the cutting tool body 200.

Moreover, since the first flank 63A (or 63B or 63C) does not become the receptacle face to be attached to the cutting tool body 200, it is possible to prevent the first flank 63A, 63B, and 63C from being damaged, thereby enabling excellent cutting.

According to Embodiment 2, the inclination angle $\gamma$ of the first major cutting edge 57A (or 57B or 57C) with the seat face 11 is set to approximately 20° as viewed from the side. The invention is not limited to this setting, however it is desirable that the inclination angle $\gamma$ be 10° or more.

According to Embodiment 2, the minor cutting edge 59A (or 59B or 59C) is set so as to form an acute angle with the first major cutting edge 57A (or 57B or 57C). The invention is not limited to this setting, however the minor cutting edge 59A (or 59B or 59C) may be set to form an approximately 90 degree angle with the first major cutting edge 57A (or 57B or 57C).

According to Embodiment 2, the first flank 63A (or 63B or 63C) is set so as to form an obtuse angle with the seat face 11. However, without limitation to such setting, the first flank 63A (or 63B or 63C) may be set to form a substantially right angle with the seat face 11.

Moreover, according to Embodiment 2, the second flank 64A (or 64B or 64C) is set so as to form an obtuse angle with the seat face 11. The invention is not limited to this setting, however the second flank 64A (or 64B or 64C) may be set to form an approximately 90-degree angle with the seat face 11.

As described above, even if the insert of this invention is mounted at a sufficiently large axial rake angle on the cutting tool body, it is possible to cause the envelope of the insert, which is formed during the rotations of the cutting tool, to constitute a cylindrical surface. Accordingly, the cutting tool on which this insert is mounted can allow the axial rake angle to be sufficiently large. As a result, it is possible to realize smooth cutting into a work piece at the time of cutting operations, to sufficiently improve the cutting performance, and to conduct sufficiently stable processing with almost no cutting vibrations. Moreover, even if the second edge line makes contact with the work piece during the cutting operations, the second edge line is available to cut the work piece. Furthermore, it is possible to reduce changes in the relief angle of the first edge line.

What is claimed is:

1. A cutting tool insert in a substantial plate form and of polygonal shape, the cutting tool insert comprising:
   a top face constructed and arranged to function as a tooth face;
   edge lines on the top face opposite a seat face of the insert, the edge lines formed as cutting edges, the cutting edges including a major cutting edge; and side faces extending from the tooth face toward the seat face, the side faces being flanks;

wherein as viewed from above, the major cutting edge extends from a first corner to a second corner;

wherein as viewed from above, the major cutting edge includes a first edge line and a second edge line that meet to form a first obtuse angle, an area around the first obtuse angle protrudes slightly outwards;

wherein as viewed from the side, the first edge line slopes down towards the second edge line so as to make a distance to the seat face decrease gradually, and, forms a second obtuse angle with the second edge line causing an area of the top face around the second obtuse angle to dip down towards the seat face; and wherein the first edge line is shorter than the second edge line.

2. The cutting tool insert according to claim 1, wherein an inclination angle of the first edge line with the seat face is 10° or more as viewed from the side.

3. The cutting tool insert according to claim 1, wherein the tooth face includes a first tooth face sloping down from the first edge line towards a center of the insert so as to make the distance to the seat face decrease gradually as viewed from the side.

4. The cutting tool insert according to claim 1, wherein an inclination angle of the first edge line with the seat face is 10° or more as viewed from the side, and wherein the tooth face includes a first tooth face sloping down from the first edge line towards a center of the insert so as to make the distance to the seat face decrease gradually as viewed from the side.

5. The cutting tool insert according to claim 1, wherein the tooth face includes a second tooth face sloping down from the second edge line towards a center of the insert so as to make the distance to the seat face decrease gradually as viewed from the side.

6. The cutting tool insert according to claim 1, wherein an inclination angle of the first edge line with the seat face is 10° or more as viewed from the side, and wherein the tooth face includes a second tooth face sloping down from the second edge line towards a center of the insert so as to make the distance to the seat face decrease gradually as viewed from the side.

7. The cutting tool insert according to claim 1, wherein an inclination angle of the first edge line with the seat face is 10° or more as viewed from the side, and wherein the tooth face includes a first tooth face sloping down from the first edge line toward a center of the insert so as to make the distance to the seat face decrease gradually, and also includes a second tooth face sloping down from the second edge line towards the center of the insert so as to make the distance to the seat face decrease gradually as viewed from the side.

8. The cutting tool insert according to claim 1, wherein a second flank is provided that extends along the second edge line towards the seat face, and the second flank forms a right angle or an obtuse angle with the seat face.

9. The cutting tool insert according to claim 8, wherein the second flank is a receptacle face to be attached to a cutting tool body.

10. The cutting tool insert according to claim 1, wherein a first flank is provided that extends along the first edge line towards the seat face, and the first flank forms a right angle or an obtuse angle with the seat face.

11. The cutting tool insert according to claim 1, wherein as viewed from above, a minor cutting edge is provided extending toward an opposite side of the major cutting edge while forming a corner therebetween, and the minor cutting edge forms a right angle or an acute angle with the major cutting edge.

12. The cutting tool insert according to claim 11, wherein a minor cutting edge flank is formed on a side face extending from the minor cutting edge, and the minor cutting edge flank forms a positive relief angle with the minor cutting edge.

13. The cutting tool insert according to claim 11, wherein the tooth face includes a minor tooth face sloping down from the minor cutting edge towards a center of the insert so as to make the distance to the seat face decrease gradually.

14. The cutting tool insert according to claim 11, wherein as viewed from above, the minor cutting edge forms an obtuse angle with a third edge line extending towards a third corner which is positioned on the minor cutting edge side and which is adjacent to at least one of the first and second corners, the at least one of the first and second corners being formed with the major cutting edge and the minor cutting edge.

15. The cutting tool insert according to claim 1, in combination with a cutting tool, the cutting tool comprising a tool body on which the cutting tool insert is mounted.

16. The cutting tool according to claim 15, wherein concerning the cutting tool insert, at least an axial rake angle of the first edge line of the major cutting edge is a positive angle and a radial rake angle is a positive angle.

17. The cutting tool according to claim 15, wherein concerning the cutting tool insert the major cutting edge positioned on an outer surface of the tool body, a turning radius of a front end of the first edge line relative to a rotation axis of the tool body, is substantially similar to the same as a turning radius of a rear end of the first edge line relative to the rotation axis of the tool body.

18. The cutting tool according to claim 15, wherein concerning the cutting tool insert, at least an axial rake angle of the first edge line of the major cutting edge is a positive angle and a radial rake angle is a positive angle and wherein concerning the major cutting edge positioned on an outer surface of the tool body, a turning radius of a front end of the first edge line relative to a rotation axis of the tool body, is almost the same as a turning radius of a rear end of the first edge line relative to the rotation axis of the tool body.

19. The cutting tool according to claim 15, wherein concerning the cutting tool insert the major cutting edge positioned on an outer surface of the tool body, a turning radius of a front end of the first edge line relative to a rotation axis of the tool body, is almost the same as a turning radius of a rear end of the first edge line relative to the rotation axis of the tool body, and a turning radius of the second edge line relative to the rotation axis of the tool body, is almost the same as or less than the turning radius of the front end of the first edge line.

20. The cutting tool according to claim 15, wherein concerning the cutting tool insert, at least an axial rake angle of the first edge line of the major cutting edge is a positive angle and a radial rake angle is a positive angle, and wherein concerning the major cutting edge positioned on a outer surface of the tool body, a turning radius of the second edge line relative to a rotation axis of the tool body, is almost the same as or less than a turning radius of a front end of the first edge line.

* * * * *